March 6, 1962 H. E. ROLFE, JR 3,023,711
AUTOMOBILE SHIPPING DEVICE
Filed Nov. 14, 1958 5 Sheets-Sheet 1
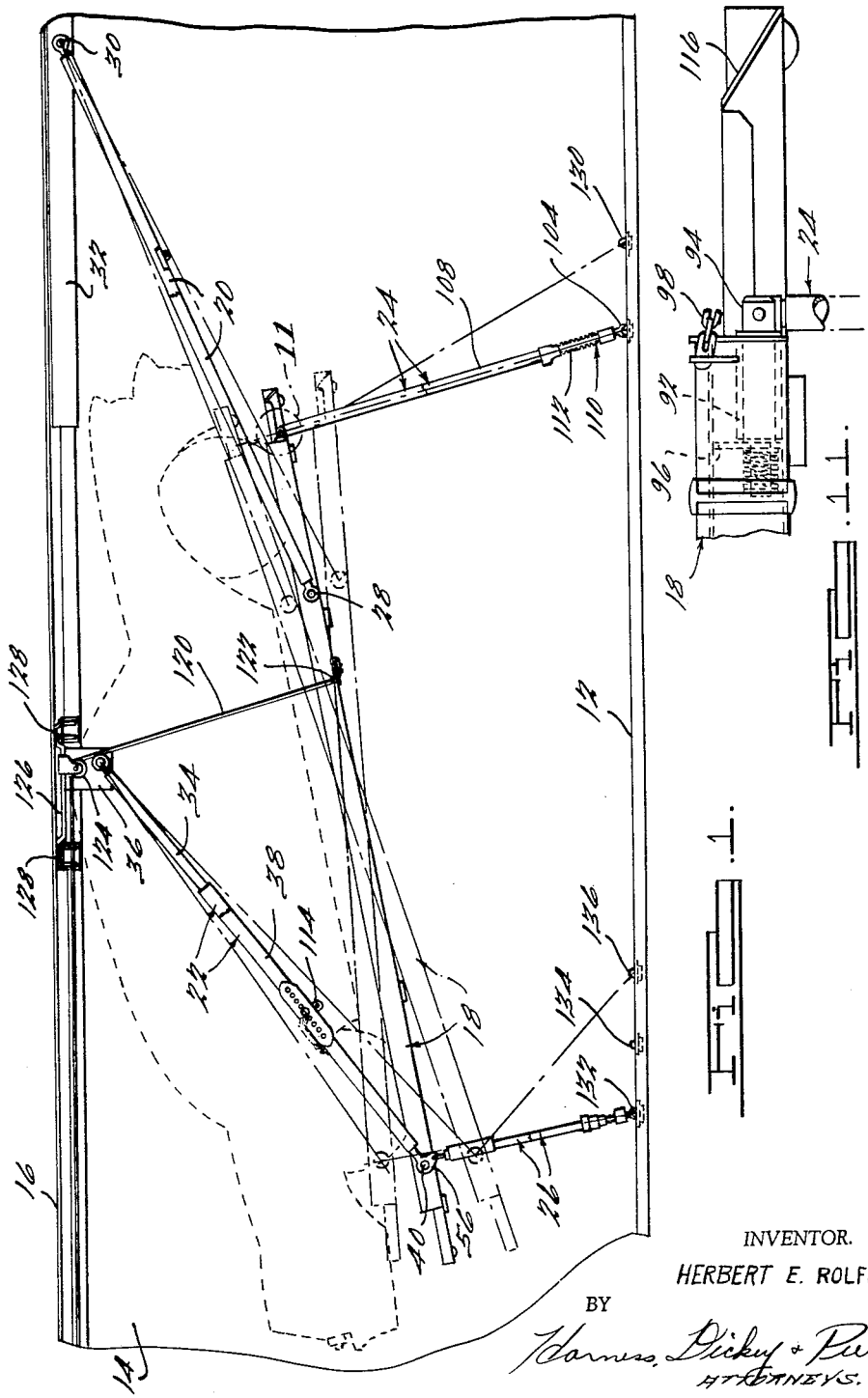
INVENTOR.
HERBERT E. ROLFE, JR.
BY
ATTORNEYS.

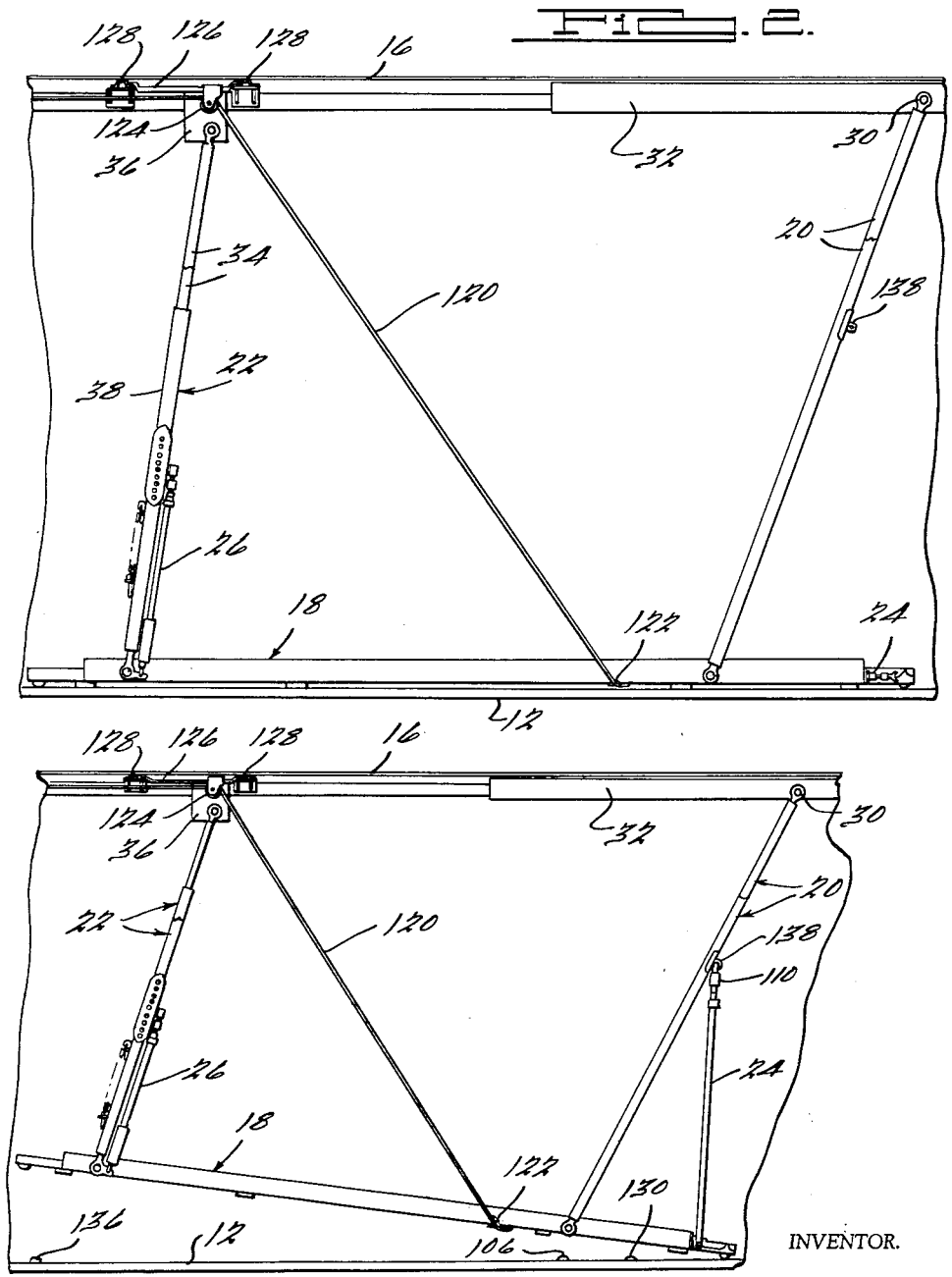

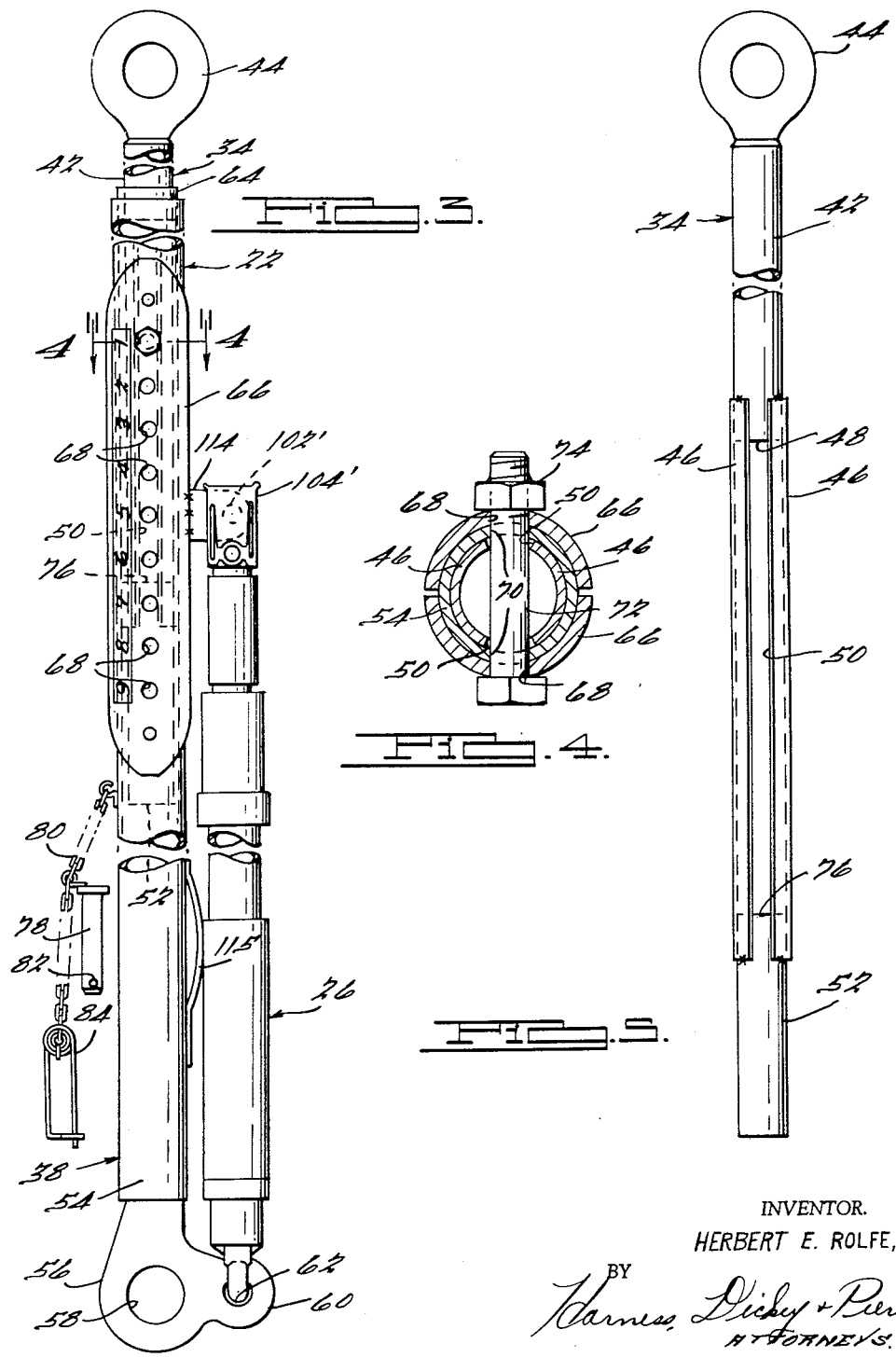

March 6, 1962 H. E. ROLFE, JR 3,023,711
AUTOMOBILE SHIPPING DEVICE
Filed Nov. 14, 1958 5 Sheets-Sheet 4
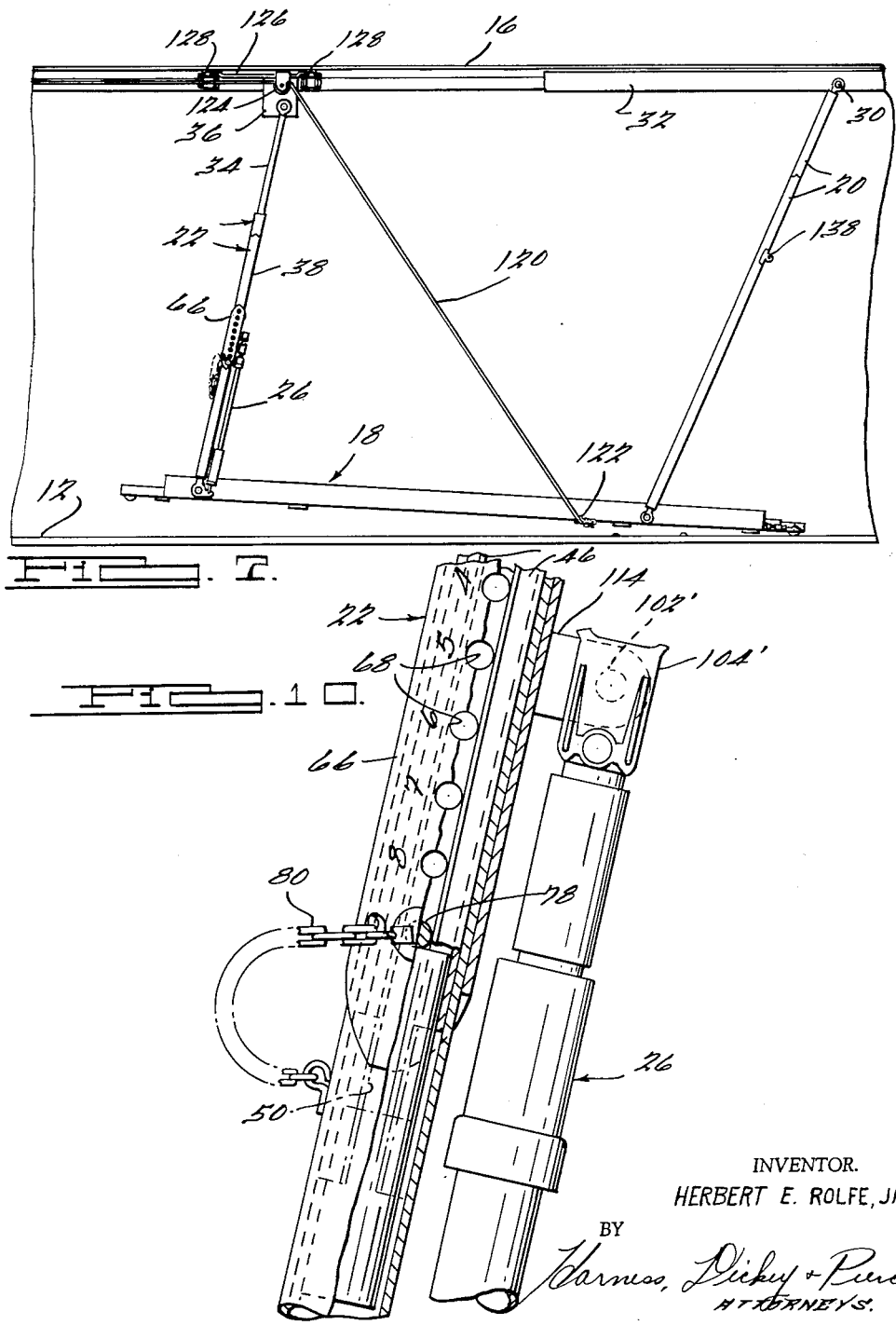
INVENTOR.
HERBERT E. ROLFE, JR.

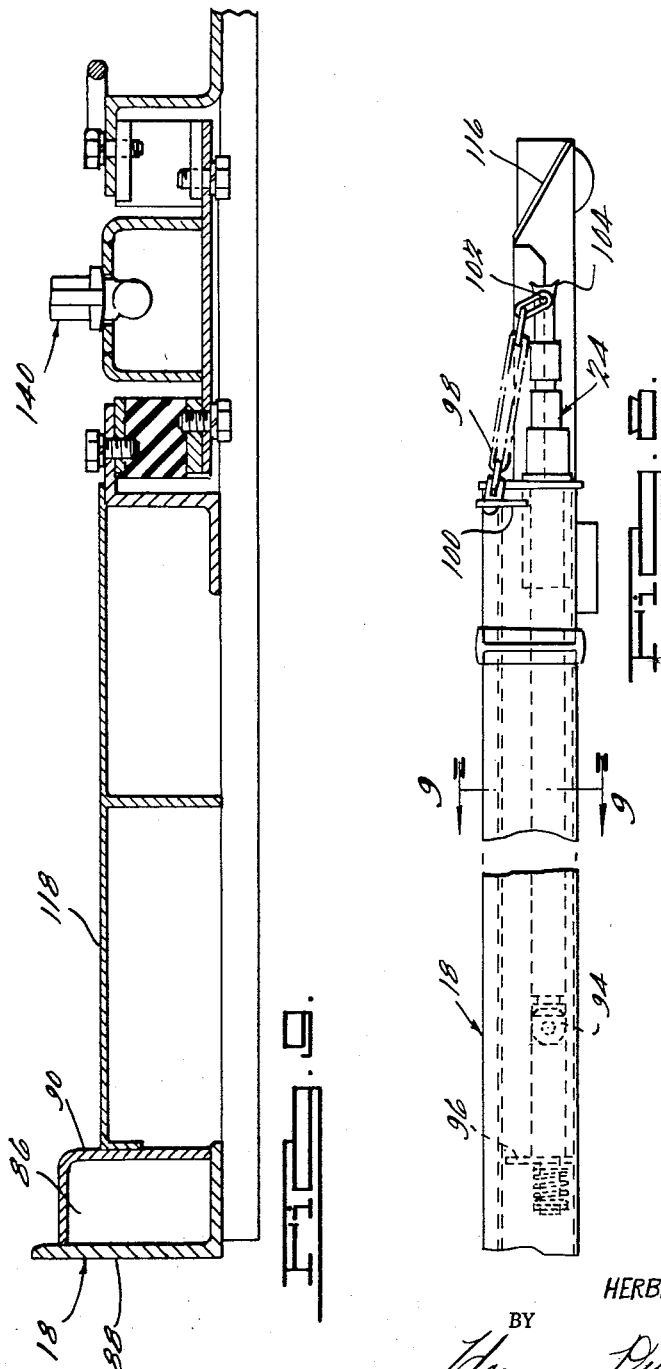

United States Patent Office 3,023,711
Patented Mar. 6, 1962

3,023,711
AUTOMOBILE SHIPPING DEVICE
Herbert E. Rolfe, Jr., Garden City, Mich., assignor to Evans Products Company, Plymouth, Mich., a corporation of Delaware
Filed Nov. 14, 1958, Ser. No. 773,948
4 Claims. (Cl. 105—368)

The present invention relates to automobile shipping devices and more particularly, to an improved automobile shipping device of the type adapted to be installed in railway freight cars for moving an automobile to and supporting it in a transport or semi-decking position. More specifically, the present invention relates to such an automobile shipping device which includes an arm having means for adjusting the effective length of the arm for providing desired variations in the transport position of the automobile and to improved means for facilitating and an improved method of effecting such adjustment. An automobile shipping device including such arm means is the subject of the co-pending application of Harvey W. Chapman, Serial Number 773,950, filed November 14, 1958.

It is an object of the present invention to provide an improved automobile shipping device of this general type which is simple in design, economical of manufacture, reliable and efficient in operation, and which is easily adjusted by the operator for varying the position of the shipping device to accommodate different sizes and shapes of automobiles.

More specifically, it is an object of the present invention to provide, in such a shipping device in which the car supporting frame is carried by pairs of arms, at least one pair of which includes means for varying the effective length of the arms, an improved apparatus for effecting certain desired adjustments in the effective length of such arms.

It is also an object of the present invention to provide an improved means for taking the load off of the telescoping arms of such a shipping device and effecting desired telescoping movement of these arms to permit any desired adjustment of the means for effecting the varying length of the arms while the arms are unloaded.

Other and more detailed objects of the present invention will be appreciated by those skilled in the art from a consideration of the following specification, the appended claims and the accompanying drawings wherein:

FIGURE 1 is a broken, somewhat diagrammatic view showing a portion of a freight car and an automobile shipping device embodying the present invention mounted therein, the automobile shipping device being shown in full lines in an intermediate position and limiting positions to which it can be adjusted being shown in broken lines;

FIGURE 2 is a view similar to FIGURE 1, showing the automobile shipping device positioned with the car receiving frame on the floor of the freight car;

FIGURE 3 is an enlarged broken view of the telescoping arm of the shipping device and showing the rear leg in its stored or inoperative position;

FIGURE 4 is a transverse sectional view of the structure illustrated in FIGURE 3, taken substantially along the line 4—4 thereof;

FIGURE 5 is a broken elevational view of the inner telescoping member of the telescoping arm illustrated in FIGURE 3;

FIGURE 6 is a view similar to FIGURE 2, showing the arrangement of the automobile shipping device during the effecting of certain adjustments in the means for varying the maximum effective length of the telescoping arms;

FIGURE 7 is a view similar to FIGURE 6 showing the position of the automobile shipping device when the telescoping arms are adjusted for their shortest effective length and the frame is disposed adjacent the floor for receiving an automobile;

FIGURE 8 is a broken enlarged elevational view of a portion of the automobile shipping device, showing the stored position of the front leg;

FIGURE 9 is an enlarged transverse sectional view of the structure illustrated in FIGURE 8, taken substantially along the line 9—9 thereof with the front leg withdrawn from its stored position;

FIGURE 10 is an enlarged broken sectional view of the telescoping arm structure showing in full lines the position of the parts when the shipping device is in the position illustrated in FIGURE 7 and showing in broken lines the position of the parts when the shipping device is in the position illustrated in FIGURE 6; and, FIGURE 11 is a broken elevational view similar to FIGURE 8 showing an operative position of the front leg.

Referring to the drawings, and particularly to FIGURE 1 thereof, the floor of the freight car is indicated at 12, the side wall at 14, and a horizontal longitudinally extending frame member or side plate at 16. This frame member 16 connects the side wall 14 to the top of the car (not shown). FIGURE 1 shows only a part of one end of the car, the right-hand portion of FIGURE 1 being adjacent the center of the car and the left-hand portion of FIGURE 1 being adjacent one end of the car.

The automobile shipping device illustrated generally comprises a frame generally indicated at 18, which is supported on a pair of front arms 20, a pair of rear arms 22, a pair of front legs 24 and a pair of rear legs 26. The front arms 20 have their lower ends pivotally connected to opposite sides of the frame 18, as indicated at 28 adjacent one end of the frame 18 and have their upper ends pivotally connected as shown at 30 to a reinforcing plate 32 secured to and extending along the central portion of the car frame member 16. Each of the rear arms 22 includes an inner arm member 34, the upper end of which is pivotally connected to a plate 36 secured to and depending from the car frame member 16 and the lower end of which extends into the upper end of the outer member 38 of the telescoping arm 22, the lower end of which is pivotally connected to one side of the frame 18 adjacent its opposite or rear end as indicated at 40.

The inner member 34 of the telescoping arm 22 is illustrated in elevation in FIGURE 5 and includes a tube 42 carrying an eye member 44 at its upper end. The inner member 34 includes a pair of spaced tubular segments 46 secured at one end to the opposite end of the tube 42 and carrying at its opposite end the tubular extension 52. These spaced parallel tube segments 46, which are shown in cross section in FIGURE 4, define aligned longitudinally extending slots 50 therebetween. The ends of the slots 50 are defined by the lower end 48 of the tube 42 and by the adjacent end 76 of the tube 52. The tubular extension 52 is fitted in and secured to the ends of the tubular segments 46. The outer telescoping member 38 of the telescoping arm 22 comprises a tubular member 54 carrying a fitting 56 secured to its lower end and having an eye 58 through which it is pivotally connected to the frame 18 and a laterally extending projection 60 having an eye 62 to which one end of the rear leg 26 is permanently pivotally connected. The tube 54 carries a collar 64 fixed in its upper end which is adapted to receive and slidably fit the tube 42 of the inner arm 34. In assembling the arm 22, the collar 64 is placed over the tube 42 during the assembly of the inner member 34 and the collar 64 is welded or otherwise suitably secured to the outer member tube 54 after the inner member has been telescoped into the tube 54.

A pair of semi-cylindrically shaped reinforcing plates 66 are secured to the opposite sides of the tube 54 and have a series of pairs of aligned openings 68 numbered 1 through 9, inclusive, spaced longitudinally thereof. The tube 54 is also provided with a plurality of openings 70 aligned with and constituting continuations of the openings 68 in the reinforcing plates 66. It will be appreciated that if desired, all of these openings 68 and 70 may be formed in suitable drilling operations after the reinforcing plates 66 have been welded or otherwise suitably secured in place on the tube 54. A bolt 72 is permanently mounted in the upper of the holes 68, this being the number 1 hole of the nine holes 68 spaced longitudinally of the reinforcing plates 66. The bolt 72 is held in place by a nut 74 which is staked in place. It will be noted from FIGURE 4 that the bolt 72, in addition to extending through the apertures 68 in the reinforcing plates 66, also, of course, extends through the apertures 70 in the tube 54 and through the slots 50 defined by the inner member 34.

It will also be appreciated that when the inner member 34 is withdrawn relative to the outer member 38, until the bolt 72 engages the end 76 of the inner member tube 52, the telescoping arm 22 has been extended to its maximum length. The telescoping arm 22 also carries a pin 78 secured to the tube 54 by a chain 80, which pin 78 is adapted to be selectively inserted through the apertures numbered 2 through 9 of the apertures 68 and through the apertures 70 aligned therewith and the slot 50 to provide for desired variations in the effective length to which the telescoping arm 22 may be extended. It will be appreciated that by mounting the pin selectively in the apertures numbered 2 through 9, inclusive, of the apertures 68, the effective length of the arm may be reduced as desired. It will be appreciated that with the pin 78 in one of these apertures, the arm 22 will extend only until the pin 78 engages the end 76 of the tube 52 at the lower end of the slot 50 and the effective length to which the arm 22 may be extended will be shortened by the distance between the pin 78 and the bolt 72. The pin 78 is provided with a transverse opening 82 through which may be extended a wire safety clip 84 to prevent accidental withdrawal of the pin 78 from the selected aperture 68.

Each front leg 24 is disposable in a stored position illustrated in FIGURE 8, in which the leg 24 telescopes into and is housed in a chamber 86 (see FIGURE 9) extending longitudinally of the frame 18 and formed by a side angle 88 thereof and a reinforcing angle 90. A fixed anchor tube 92 (see FIGURE 11) is mounted in the chamber 86 and slidably supports the leg 24 during movement thereof to and from the stored position. At its inner end the leg 24 carries a pivotally connected end section 94 and a stop plate 96 adapted to engage the inner end of the fixed tube 92 to prevent withdrawal of the end section 94 from the tube 92. The leg 24 may be held in its stored position by a chain 98, one end of which is secured to the frame 18 by a hook 100, and the other end of which is engaged by the pivot pin 102 carried by the clevis 104 at the outer end of the leg 24. When the pin 102 is disengaged from the chain 98, the leg 24 may be withdrawn from the frame 18 to the limiting position determined by the stop plate 96 and pivoted relative to its inner end section 94 to the operative position illustrated in FIGURE 1, and in which the clevis 104 is secured to an anchor fitting 106 provided in the floor 12 of the car. The construction of the clevis 104 forms no part of the present invention and is of the general type shown in detail in United States Letters Patent No. 2,118,030, granted May 24, 1938, for an invention of Oliver V. Cardinal.

Each leg 24 includes an outer member 108 and an inner member 110 which is extensible relative thereto and readily locked in any one of a plurality of extended positions by the inter-engagement of teeth 112 formed externally of the inner member 110 and co-operating teeth (not shown) on the outer member 108. Extensible legs of this construction are fully disclosed in the above mentioned, and now expired, United States Letters Patent No. 2,164,662. It is there pointed out that the locking teeth are disengaged by rotating the inner member 110 approximately ninety degrees (90°) relative to the outer member 108, after which the inner member may be moved to a desired extended position and then again rotated relative to the outer member to re-engage the teeth.

The rear legs 26 are similar in construction to, but shorter than, the front legs 24 and different therefrom in that their upper ends, considered in the operative position illustrated in FIGURE 1, are pivotally connected to the lateral projection 60 on the fitting 56, as best illustrated in FIGURE 3, and the legs 26 in their stored position extend generally parallel to the telescoping rear arms 22 as illustrated in FIGURE 3, and the clevises 104' thereof are connected to a retainer lug 114 carried by the tube 54. A flat spring 115 is mounted on the tube 54 of the telescoping arm 22 and is engaged by the leg 26 to prevent vibration of the leg 26 relative to the arm 22 when the leg 26 is in its stored position.

When the frame 18 is lowered to the floor, with the front legs 24 and the rear legs 26 in the stored positions, as illustrated in FIGURE 2, the length of the rear telescoping arm 22 is such that the inner member 34 assumes a position relative to the outer member 38 such that the slot 50 in the inner member 34 is aligned with those of the apertures 68 numbered 1 through 6, inclusive. This relative position of the inner and outer members of the telescoping arm 22 is illustrated in FIGURE 3, in which it will be seen that the end 76 of the tube 52, which defines the lower end of the slot 50, is disposed between those of the apertures 68 which are numbered 6 and 7. Accordingly, with the frame 18 on the floor in the position illustrated in FIGURE 2, the pin 78 may be placed in any of the apertures 68 which are numbered 2, 3, 4, 5 or 6. If the vehicle to be shipped on the frame 18 is one for which the proper setting of the pin 78 is in one of these apertures numbered 2, 3, 4, 5 or 6, or one in which the pin 78 is not needed because the proper setting is provided by the bolt 72 in the aperture 68 numbered 1, the proper adjustment may be made while the frame 18 is on the floor 12. That is, the pin 78 may be left out or placed in the proper aperture 68 numbered 2, 3, 4, 5 or 6 and the vehicle driven onto the frame 18, the wheels of the vehicle riding up the ramps 116 (see FIGURE 8) onto the wheel pans 118 (see FIGURE 9).

The frame 18 is then moved to the semi-decking or transport position by cables 120 connected to the cable shoes 122 provided on the frame. These cables 120 are disposed at opposite sides of the freight car and extend upwardly over pulley wheels 124 suitably supported on a longitudinally extending rod 126 extending between and supported on transversely extending frame members 128, commonly known as carlines, which are supported at their opposite ends on the longitudinally extending car frame members 16. The cables 120 are operated by suitable hoist means (not shown) located at the adjacent end of the freight car. When the frame 18 reaches the desired transport position determined by the effective maximum length of the telescoping rear arms 22, the front and rear legs 24 and 26 are moved from their stored positions and swung downwardly. The inner members are extended to provide the proper length and the clevises 104 at the lower ends thereof are connected to the anchor fittings provided on the floor.

There are two such anchor fittings 106 and 130 to which each of the front legs 24 may be connected and three anchor fittings 132, 134 and 136 to which each of the rear legs 26 may be connected. The front legs 24 are connected to the anchor fittings 106 where possible so that a minimum extension of the inner members 110 is required. Where the position of the frame 18 is such that the legs 24 are too long to permit connection to the anchor fittings 106, they are connected to the anchor fittings 130. The rear legs 26 are generally connected to the ones of the floor anchor fittings 132, 134 and 136 in which they are most nearly perpendicular to the frame 18. It will be appreciated, of course, that for the different positions of the frame 18, the front and rear legs 24 and 26 will be extended to different lengths to properly support the frame in the desired transport position. When the legs have been secured in place, the tension on the cables 120 is released.

The present invention contemplates the provision of a novel means, arrangement for effecting the adjustments of the rear arms 22 obtained when the pins 78 are in the apertures 68 numbered 7, 8 and 9 which adjustments, as pointed out above, are not possible when the frame 18 is on the floor in the position illustrated in FIGURE 2. For this purpose, a retainer lug 138 is welded or otherwise suitably secured to the front arm 20 in a position to be engaged by the clevis 104 of the front leg 24 and the pivot pin 102 thereof when the leg 24 is withdrawn from the stored position illustrated in FIGURE 2 and pivoted upwardly toward the front arm 20, and with the inner member 110 thereof extended slightly. The legs 24, when thus connected to the retainer lug 138, prevent pivotal movement of the frame 18 relative to the front arms 20.

It will now be appreciated that when the frame 18 is lifted by the cables 120, the frame, the front arms 20 and the front legs 24 move as a unit, causing the lower end of the telescoping rear arms 22 to move about the pivotal connections 30 at the upper ends of the front arms 20. This movement, which takes place before the automobile is loaded onto the frame 18, causes a relatively rapid telescoping of the rear arms 22, causing the slots 50 of the inner members 34 to assume the position illustrated in broken lines in FIGURE 10, in which the pin 78 can readily be inserted in the holes 68 numbered 7, 8 or 9. FIGURE 6 illustrates a position to which the frame 18 may be moved during this movement and shows the connection of the front leg 24 to the front arm 20. When the pin 78 has been inserted in one of these holes 7, 8 or 9, and the frame 18 is lowered, it will assume a position in which it is inclined relative to the floor. If, for example, the pin 78 is placed in the aperture 68 numbered 9, and the frame 18 is then lowered, the parts of the telescoping arm will assume the position illustrated in full lines in FIGURE 10 and the shiping device as a whole, will assume the position illustrated in FIGURE 7. It will be noted that in FIGURE 7 the leg 24 has been disconnected from the retainer lug 138 and returned to its stored position in the frame 18 preparatory to loading of a vehicle on the frame 18.

It will be appreciated that the above described connection of the front legs 24 to the front arms 20 will be satisfactory in all arm and frame arrangements in which it causes the pivotal connections at the lower ends of the rear arms 22 to have a component of movement toward the pivotal connections at the upper ends of the rear arms 22 and sufficient to bring the lower end of the slot 50 below the aperture 68 which is numbered 9.

After a vehicle is moved onto the frame 18, and suitably secured in place, the frame is then raised by the cables 120 to the desired transport position. The front and rear legs 24 and 26, respectively, are then extended to the proper lengths and connected to the proper ones of the anchors 106, 130, 132, 134 and 136 on the floor of the car. It will be appreciated that in removing the pins 78 from the apertures numbered 7, 8 and 9, the front legs 24 are again connected to the front arms 20 and the now interconnected frame 18, front legs 24 and front arms 20 are moved as a unit about the pivotal connections 30 at the upper ends of the front arms 20 to take the load off of the pins 78 and permit withdrawal thereof.

One of the tie-down devices used to hold the vehicle in place on the frame is partially shown in FIGURE 9 and generally indicated by the reference character 140. The details of this tie-down form no part of the present invention, but are the subject matter of the co-pending application of Henry L. Dunlap, Serial No. 773,969, filed November 14, 1958.

While only one specific embodiment of the present invention has been illustrated and described herein, it will be readily appreciated by those skilled in the art that numerous modifications and changes may be made without departing from the spirit of the present invention.

What is claimed is:

1. In combination, a freight car, an automobile loading frame, means securing the frame in the car including a pair of arms pivoted at their upper ends to the car on longitudinally spaced axes and at their lower ends to the frame adjacent the opposite ends thereof, means mounted on the freight car for moving the frame between a lowered automobile loading position and a plurality of raised transport positions, said arms controlling the path of movement of said frame and the inclination of said frame in said transport positions, one of said arms including axially movable sections movable to vary the length thereof, adjustable means for varying the effective length to which said one of said arms may be extended and including load carrying means loaded in response to tension loading of said one of said arms, means for preventing pivotal movement of said frame relative to the other of said arms and cooperable with said means mounted on the freight car for moving said frame to cause said frame and said other of said arms to pivot as a unit about said pivotal connection at the upper end thereof to said freight car whereby the load is removed from said load carrying means and said axially movable sections of said one of said arms are moved relative to each other to shorten said one of said arms to facilitate adjustment of said adjustable means.

2. The combination defined in claim 1 wherein said means for preventing pivotal movement comprises a member pivotally connected to said frame in spaced relation to the pivotal connection of said other of said arms thereto and pivotally connected to said one of said arms intermediate its said pivotal connections.

3. The combination defined in claim 1 including a leg pivotally connected to said frame and connectible to said freight car for supporting said frame in a transport position and wherein said means for preventing pivotal movement includes means on said other of said arms co-operable with said leg for connecting said leg to said other of said arms.

4. In combination, a freight car, an automobile loading frame, means securing the frame in the car including a pair of front arms pivotally connected at their upper ends to said freight car and pivotally connected at their lower ends to said frame at opposite sides thereof adjacent the front end thereof, a pair of rear arms pivotally connected at their upper ends to said freight car and pivotally connected at their lower ends to said frame at opposite sides thereof and adjacent the rear end thereof, each of said rear arms including first and second parts movable relative to each other for varying the length of said arm, means providing a lost motion connection between said parts, said last named means being adjustable for adjusting said lost motion connection to vary the effective lengths to which said rear arms may be extended, means for moving said frame between a loading position adjacent the floor of the freight car and a plurality of raised transport positions, a pair of front legs pivotally connected to said frame in spaced relation to said pivotal connection of said front arms thereto and adapted to be connected at their outer ends to the floor of the freight car for supporting the front end of the frams in transport position, and means on said front arms intermediate the ends thereof adapted for connection with the outer ends of said front legs to hold said front arms against pivotal movement relative to said frame so that said frame, said front arms and said front legs may be moved as a unit to take the load off of and shorten said rear arms to facilitate adjustment of said adjustable means.

References Cited in the file of this patent
UNITED STATES PATENTS

| | | |
|---|---|---|
| 2,164,662 | Nampa | July 4, 1939 |
| 2,802,429 | Storch | Aug. 13, 1957 |